US012670066B2

(12) United States Patent
Lai et al.

(10) Patent No.: US 12,670,066 B2
(45) Date of Patent: Jun. 30, 2026

(54) ABNORMAL PROGRAM SEQUENCE DETECTION

(71) Applicant: MICRON TECHNOLOGY, INC., Boise, ID (US)

(72) Inventors: Yi Lin Lai, New Tai (TW); Jen Hung Liao, Zhubei City (TW); Wai Leong Chin, Singapore (SG); Pin Hsueh Lai, New Taipei City (TW); Edric Goh, Singapore (SG)

(73) Assignee: MICRON TECHNOLOGY, INC., Boise, ID (US)

( * ) Notice: Subject to any disclaimer, the term of this patent is extended or adjusted under 35 U.S.C. 154(b) by 3 days.

(21) Appl. No.: 18/829,788

(22) Filed: Sep. 10, 2024

(65) Prior Publication Data

US 2026/0064529 A1 Mar. 5, 2026

Related U.S. Application Data

(60) Provisional application No. 63/688,803, filed on Aug. 29, 2024.

(51) Int. Cl.
*G06F 11/00* (2006.01)
*G06F 11/07* (2006.01)
*G06F 11/10* (2006.01)

(52) U.S. Cl.
CPC ...... *G06F 11/1068* (2013.01); *G06F 11/0757* (2013.01)

(58) Field of Classification Search
CPC .......................... G06F 11/1068; G06F 11/0757
See application file for complete search history.

(56) References Cited

U.S. PATENT DOCUMENTS

| | | | | | |
|---|---|---|---|---|---|
| 7,823,014 | B2 * | 10/2010 | Gorbadey | ........... | G06F 11/1438 |
| | | | | | 714/21 |
| 8,438,356 | B2 * | 5/2013 | Yoon | ........... | G06F 3/061 |
| | | | | | 711/100 |
| 8,464,203 | B2 * | 6/2013 | Imaeda | ........... | G06F 11/0757 |
| | | | | | 717/100 |
| 10,108,499 | B2 * | 10/2018 | Ibe | ........... | G06F 11/30 |
| 11,836,384 | B2 * | 12/2023 | Vishne | ........... | G06F 3/0679 |

* cited by examiner

*Primary Examiner* — Esaw T Abraham

(74) *Attorney, Agent, or Firm* — Tarolli, Sundheim, Covell & Tummino LLP

(57) ABSTRACT

A system and method for detecting abnormal program sequences on a memory device. In some examples, a timing process is initiated by either starting a timer or recording an initial timer value from the timer. A status register of the memory device is checked in response to initiating the timing process to determine whether the memory device is in a busy state corresponding to performing the program operation. The timer is stopped or a current timer value is recorded from the timer in response to determining that the memory device is not in the busy state. A determination is made to determine an elapsed time of the timer since being started or based on the initial and current timer values to provide a checked operation time. The checked operation time and the defined operation time are evaluated to determine whether the program sequence for implementing the program operation was abnormal.

17 Claims, 11 Drawing Sheets

300

| Timer Group ID | Program CMD Type | Busy Check Types | Timer Value |
|---|---|---|---|
| 1 | ProgramCMDType1 | CheckType1,CheckType2 | Based on NAND Spec |
| 2 | ProgramCMDType2 | CheckType1,CheckType3 | Based on NAND Spec |

FIG. 3

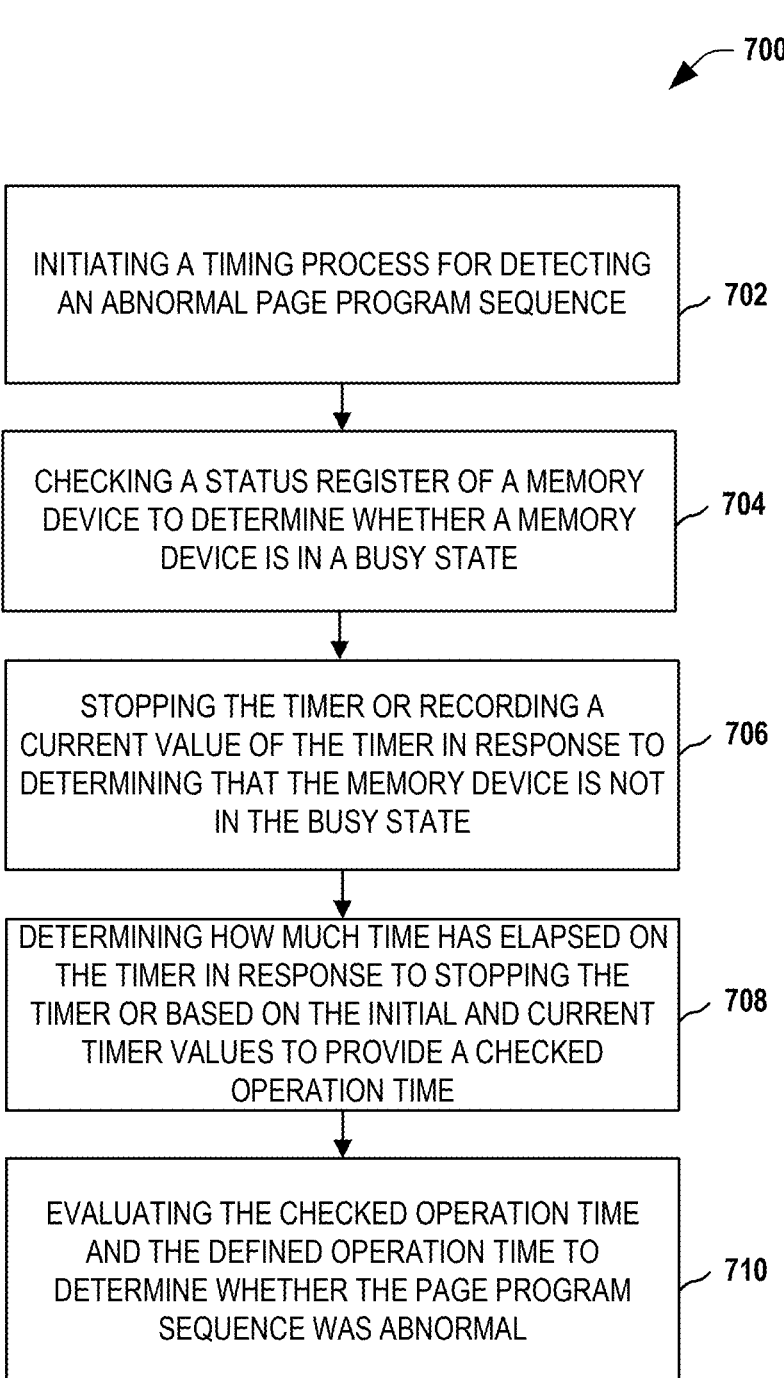

700

INITIATING A TIMING PROCESS FOR DETECTING AN ABNORMAL PAGE PROGRAM SEQUENCE — 702

CHECKING A STATUS REGISTER OF A MEMORY DEVICE TO DETERMINE WHETHER A MEMORY DEVICE IS IN A BUSY STATE — 704

STOPPING THE TIMER OR RECORDING A CURRENT VALUE OF THE TIMER IN RESPONSE TO DETERMINING THAT THE MEMORY DEVICE IS NOT IN THE BUSY STATE — 706

DETERMINING HOW MUCH TIME HAS ELAPSED ON THE TIMER IN RESPONSE TO STOPPING THE TIMER OR BASED ON THE INITIAL AND CURRENT TIMER VALUES TO PROVIDE A CHECKED OPERATION TIME — 708

EVALUATING THE CHECKED OPERATION TIME AND THE DEFINED OPERATION TIME TO DETERMINE WHETHER THE PAGE PROGRAM SEQUENCE WAS ABNORMAL — 710

FIG. 7

ABNORMAL PROGRAM SEQUENCE DETECTION

RELATED APPLICATION

This application claims the benefit and priority of U.S. Provisional Patent Application No. 63/688,803, filed 29 Aug. 2024, which is incorporated herein in its entirety.

TECHNICAL FIELD

This disclosure relates to detection of abnormal program sequences.

BACKGROUND

A memory sub-system includes a memory device designed for data storage. These memory devices are implemented as non-volatile and volatile memory devices in various examples. In some such examples, a host system employs a memory sub-system for the purposes of storing data on the memory devices and for retrieving data from the memory devices.

A program sequence refers to a series of steps and commands executed by a memory device to perform a specific operation, such as writing data to memory cells. For example, in a NAND memory device, a program sequence can include commands to select target addresses, the data to be written, and error-correcting codes (ECC).

BRIEF DESCRIPTION OF THE DRAWINGS

FIG. 3 illustrates an example of a timer configuration table.

FIG. 7 illustrates a flowchart of an example method for detecting an abnormal page program sequence.

DETAILED DESCRIPTION

Figure 1:
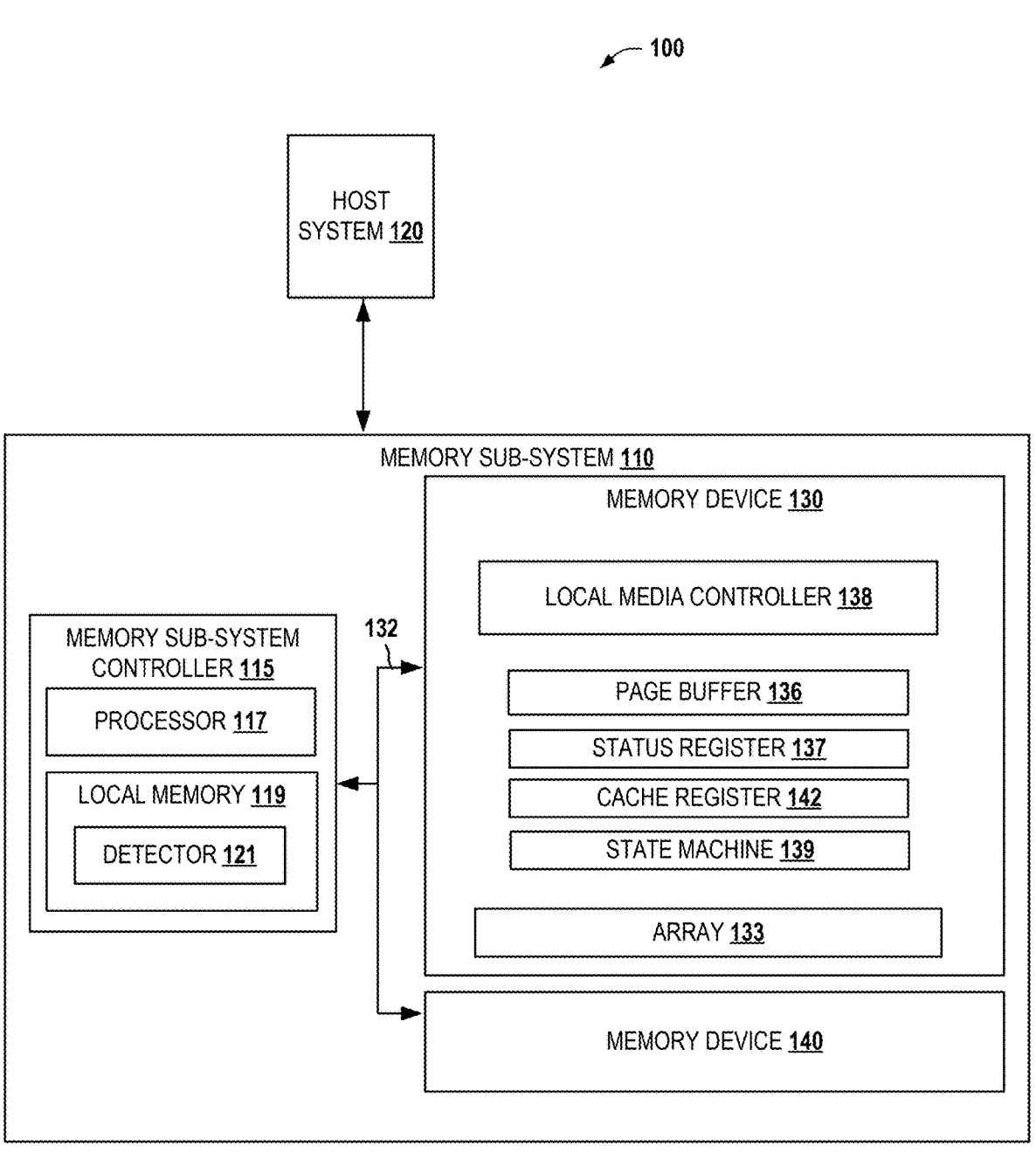
FIG. 1 illustrates a memory-sub system with a detector for detecting abnormal memory program sequences.

This description relates to a system and method for detecting abnormal program sequences of a memory device. A timer is initiated when a program command is issued by a memory sub-system controller to the memory device to perform a program operation according to a program sequence. In response to the timer being started, a status register of the memory device is checked to see if the memory device is busy with a program operation; if not, the timer stops. The elapsed time, or checked operation time, is then compared to a defined operation time to detect abnormalities in the program sequence. The defined operation time is a busy time of the memory device and thus corresponds to an amount of time needed by the memory device to perform the program operation. During the busy time, the memory device is unavailable. A program sequence is considered abnormal if the checked operation time is either less than or significantly exceeds the defined operation time (e.g., exceeds the defined operation time by a factor of 3 or more). Various error types in the memory device can be identified based on the comparison, which can trigger specific error handling mechanisms to ensure data integrity.

More generally, this description relates to detection of abnormal program sequences of a memory device. Memory devices, such as non-volatile memory devices (e.g., Not-AND (NAND) memory devices) can be used to store data that may be needed by various processes, applications and/or hardware components on a host system. A non-volatile memory device is a package that includes a die(s). Each such die can include a plane(s). For some types of non-volatile memory devices (e.g., NAND memory devices), each plane includes a set of physical blocks and each physical block includes a set of pages that are organized in wordlines. Each page includes a set of memory cells, which are commonly referred to as cells. A cell is an electronic circuit that stores information. A cell stores at least one bit of binary information and has various logic states that correlate to the number of bits being stored. The logic states are represented by binary values, such as '0' and '1', or as combinations of such values, such as '00', '01', '10' and '11'.

A memory device includes multiple cells arranged in a two-dimensional or a three-dimensional grid. In some examples, memory cells are formed on a silicon wafer in an array of columns connected by conductive lines (also referred to as bitlines, or BLs) and rows connected by conductive lines (also referred to as wordlines or WLs). A wordline has a row of associated memory cells in a memory device that are used with a bitline or multiple bitlines to generate the address of each of the memory cells. The intersection of a bitline and a wordline defines an address of a memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory device(s).

A memory page in the context of non-volatile memory devices, such as NAND memory, refers to a smallest writable unit within the memory structure. Each memory page is formed of numerous memory cells where data is stored. In NAND memory, for example, a memory page is where actual user data gets written along with additional metadata used for managing the memory and ensuring data integrity. This metadata might include error correction codes (ECC) that help detect and correct errors that might occur during data read/write cycles. The size of a memory page can vary depending on the specific type of memory technology and the manufacturer's design. Common page sizes in NAND flash memory range from 4 KB to 16 KB or more.

Memory pages are organized into wordlines, which are in turn organized into blocks. More specifically, in NAND memory, the relationship between blocks, wordlines and pages is structured hierarchically for operation of the memory. A block represents a fundamental unit of data storage in NAND flash memory and consists of several pages. Wordlines in NAND memory are essentially wirings that connect multiple memory cells across a row. Each wordline activates a specific row of cells during read and write operations, effectively addressing all the cells in a row simultaneously, which corresponds to accessing a single page of data. Wordlines enable addressing and accessing data stored in the memory cells. In effect, a wordline controls access to a set of pages of data. When a specific wordline is activated, all the memory cells along that wordline can be accessed simultaneously. This means that each page corresponds to a wordline and the data stored in a page is written to or read from the memory cells that the wordline addresses. When data is written to NAND flash memory, the organization and storage occur at the page level. This hierarchical structure allows for efficient management of data.

Generally, to access data from a memory device, such as NAND memory, a host system issues a request to a memory-sub system controller (also known as a memory controller). For example, a write request issued by the host system can include a write command, addresses (e.g., target address in the memory device where data should be written), data (e.g., actual data to be written), in some instances metadata and any other control information needed for operation. The memory sub-system controller can validate the request to ensure that the request is correctly formatted and that the addresses are valid.

The memory sub-system can process the request to issue a program command to initiate a program operation, which enables writing (e.g., programming) of data to cells of the memory device. A program operation (e.g., a page program operation) refers to an execution and completion of a task used by memory devices (e.g., NAND memory devices) for accessing data (e.g., writing, reading and/or erasing data) at a location (e.g., one or more pages) within an array (e.g., memory block) of the memory device. Thus, a program operation can refer to an actual execution and completion of tasks, such as writing data to the memory cells in response to one or more program commands. For example, if the program operation is writing data to the memory cells, the program operation can include several steps, such as loading data into page buffer, programming the data from the page buffers into the memory cells, and verifying a completion of the write. The entire program operation must meet specific timing requirements to ensure data is written accurately and to maintain data integrity. For example, a program operation can have several stages, each with its own timing requirement. Example stages can include loading data to a page buffer, programming data into cells, and verification and ECC checks. A program sequence (also known as a command sequence) refers to a series of steps and/or commands that the memory device implements to perform the program operation. The program sequence (or command sequence) can include commands, target addresses, data to be written and ECC.

In NAND memory operations, the memory sub-system controller can issue one or commands for one or more stages of the program operation. For example, a program write command (e.g., a page program write command) can be sent by the memory sub-system controller to an local media controller of the memory device, which can identify a program operation (e.g., write operation), addresses (e.g., locations in an array where data should be written), data (e.g., actual data that is to be written to the array) and additional data (e.g., metadata, such as ECC). The local media controller initiates a program sequence, such as a write page program sequence to perform a program operation (e.g., write operation) to write data to the array based on the program write command. The program sequence can include a command phase, address phase, data phase and program phase. During the command phase, the memory sub-system controller sends the program write command to the local media controller to prepare the memory device for a program write operation. During the address phase, the memory sub-system controller sends address cycles to the local media controller to specify a location in the array where the data is to be written as part of the program write operation. During the data phase, the data that is to be written is loaded into a page buffer or cache register of the memory device. During the program phase, a program start write command is sent by the memory sub-system controller to the local media controller to start (initiate) the program write operation.

The memory sub-system controller monitors a state of the program write operation and its success by observing (or reading) status register bits of a status register in the memory device 130. The status register bits can include one or more operation state bits. The operation state bits can include a ready (RDY) bit that indicates whether the memory device is ready for a program command or is busy (e.g., with a current program command) and an array-ready (ARDY) bit that indicates whether the memory device is ready for a next phase of an operation. An RDY bit=1 indicates that the local media controller is ready for a new program command, and the RDY bit=0 indicates that the local media controller is busy (e.g., processing an existing program command). The status register bits also include operation status (or indicator) bits, including an operation success status bit (e.g., indicating that the program operation was successful) and an operation fail status bit (e.g., indicating that the program operation was a failure).

In some NAND memory devices, the operation state bits have a default bit state or asserted bit state/value (e.g., "1"). This is an initial bit state before any program command is issued and is maintained by the memory device until the local media controller enters a busy state during which the memory device performs the program operation. Similarly, the operation status bits have a default bit state (e.g., "0") or asserted bit state/value. The local media controller updates the one or more operation state bits in response to initiating the program operation (e.g., the writing of the data to the array). The local media controller updates the operation success status bits to "0" to indicate a successful program operation, such as a successful program write operation. If the program operation fails, the local media controller updates the operation fail status bit, which alerts system firmware (FW) of the memory device that there was a programming failure (or error). The system FW triggers one or more fail handling mechanisms to verify previous data integrity and prevent user data loss.

In some instances, one or more program commands issued by the memory sub-system controller for the program sequence can become corrupted due to signal integrity issues (e.g., as signals representative of the program commands travel through high-speed interconnects, such as data lines). As a result, the local media controller may not correctly interpret or execute the program commands. Signal integrity issues can be caused by noise, crosstalk, reflections, attenuation, signal skew and jitter. Program commands affected by signal integrity issues can be referred to as partial or corrupt program commands. Additionally, if a new program command is issued by the memory sub-system controller while the local media controller is still busy processing a prior program command, the local media controller may not acknowledge the new program command. Program commands that are not processed by the memory device while the memory device is processing an existing program command can be referred to as invalid program commands. The operation state bits will have a default state of "1" and the operation indicator status bits will have a default state of "0", indicating that no error has occurred since the program command was not processed by the local media controller. This can cause the memory sub-system controller to falsely assume (based on the status register bits) that the write program operation was successful, potentially leading to user data loss.

Thus, when the program command is not processed by the local media controller because of signal integrity issues or because the memory device is busy with a prior program command this can lead to an incomplete or invalid program sequence at the memory device, which can cause a data loss event for a host read. For example, when the host system tries to read the data from the memory device, the data in the array may not be what was intended to be written, corrupted or is invalid. This causes the host system to make a false data read, as the host system receives unexpected or incomplete data and thus results in data loss. Existing solutions rely on a FW team to validate, debug, flag and fix issues leading to abnormal writes sequences, which is time prohibitive and costly.

According to the examples of the present description, a memory sub-system can be configured with a detector that can be configured to monitor a memory device (e.g., a NAND memory device) for an abnormal program sequence, such as a faulty write page program sequence. An abnormal program sequence corresponds to a program sequence that includes at least one partial or invalid program command. For example, in response to detecting an abnormal program sequence, for example, when an error is detected in a write operation, the detector can set (or flag) one or more error status bits for one or more systems to trigger appropriate data recovery protocols to recover from a defective or corrupted program operation to protect data integrity in response to determining the program sequence is abnormal. Example data recovery protocols can include, but not limited to, a retry mechanism, where the host system reissues new commands to write the data to the same or different memory location in a memory device.

The present description relates to systems and methods of detecting an abnormal program sequence for performing a program operation on a memory device. For example, a timing process can be initiated by either starting a timer or recording an initial timer value from the timer. In some examples, the timer is started or evaluated to record the initial timer value in response to the memory sub-system controller issuing (or generating) a program command for the memory device to perform the program operation. A status register of the memory device can be checked to determine if the memory device is busy with the program operation in response to starting the timer or recording the initial timer value. If the memory device is not busy, the timer is stopped or a current timer value from the timer is recorded. The elapsed time on the timer is measured, providing a checked operation time. In some examples, the checked operation time is provided based on the initial and current timer values. The checked operation time is evaluated against a defined operation time for that program command type (program operation) to determine whether the program sequence was abnormal. In some examples, the evaluation includes determining that the program sequence was abnormal in response to the checked operation time being less than the defined operation time. In some instances, if the checked operation time exceeds the defined time by a certain factor (e.g., three or more), the program sequence is also considered abnormal. In some examples, different error types in the memory device can be identified based on an evaluation of the checked operation time and the defined operation time, such as corrupted and invalid program commands. Based on an identified error type, a corresponding program failing handling mechanism can be invoked to protect an integrity of the data.

FIG. 1 illustrates a system 100 that includes a memory sub-system 110 that can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches and a storage protocol controller (e.g., PCIe controller, SATA controller, CXL controller). In some examples, the host system 120 includes a host memory controller (e.g., NVIDMM controller). In other examples, the processor chipset includes the host memory controller. The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130 and memory device(s) 140) when the memory sub-system 110 is coupled with the host system 120 by the physical host interface (e.g., PCIe or CXL bus). The physical host interface can provide an interface for passing control (or commands), address, data and other signals between the memory sub-system 110 and the host system 120. FIG. 1 illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-volatile, non-transitory computer readable media. The memory device 130 and the memory device 140 can include any combination of different types of non-volatile memory devices. Some examples of non-volatile memory devices (e.g., memory device(s) 130) include NAND type flash memory and write-in-place memory, such as three-dimensional cross-point ("3D cross-point") memory. A cross point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 and 140 include an array 133 (or multiple arrays) of memory cells. One type of memory cell, for example, single level cells (SLC) can store one bit per cell. Other types of memory cells, such as multi-level cells (MLCs), triple level cells (TLCs), quad-level cells (QLCs) and penta-level cells (PLCs) or higher, can store multiple bits per cell. In some examples, each of the memory devices 130 can have a combination of different types of memory cells, such as SLCs, MLCs, TLCs, QLCs, PLCs or some combination thereof. For instance, in some examples, a memory device can include an SLC portion, an MLC portion, a TLC portion, a QLC portion and/or a PLC portion of memory cells. The memory cells of the memory devices 130 and 140 can be grouped as pages that can refer to a logical unit of the memory device used to store data. In some types of memory (e.g., NAND), pages can be grouped into wordlines and blocks.

Although non-volatile memory components such as a 3D cross-point array of non-volatile memory cells and NAND type flash memory (e.g., 2D NAND, 3D NAND) are described, the memory devices 130 and 140 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), etc.

The memory sub-system 110 includes a memory sub-system controller 115 (or controller 115 for simplicity) to communicate with the memory device(s) 130 and 140 to perform data access operations, such as reading data, writing data or erasing data at the memory devices 130 and 140 and other such operations. The memory sub-system controller 115 can include hardware such as one or more integrated circuits and/or discrete components, a buffer memory or some combination thereof. The hardware can include digital circuitry with dedicated (e.g., hard-coded) logic to perform one or more operations, as disclosed herein. The memory sub-system controller 115 can be a microcontroller, special purpose logic circuitry (e.g., a field programmable gate array (FPGA), an application specific integrated circuit (ASIC), etc.) or other suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows and routines that control operation of the memory sub-system 110, including handling communications between the memory sub-system 110 and the host system 120. The local memory 119 is a non-transitory computer-readable medium. In some examples, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another example, the memory sub-system 110 does not include the memory sub-system controller 115 and can instead rely upon external control (e.g., provided by an external host, or by a processor or controller separate from the memory sub-system 110).

In general, the memory sub-system controller 115 can receive requests, commands or operations from the host system 120 and can convert the requests, commands or operations into instructions or appropriate commands to achieve a desired access to the memory devices 130 and 140. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory devices 130 and 140. The memory sub-system controller 115, for example, can employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the requests, commands or operations received from the host system 120 into corresponding instructions to access the memory devices 130 as well as convert responses associated with the memory devices 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the host system 120 and decode the address to access the memory devices 130 and 140.

In some examples, the memory device 130 includes a local media controller 138 that operates in concert with the memory sub-system controller 115 to execute operations on one or more memory cells of an array 133 of the memory device 130. An external controller (e.g., the memory sub-system controller 115) can externally manage the memory device 130 (e.g., perform media management operations on the memory device 130, such as wear leveling, bad block management, garbage collection, error correction, over-provisioning, data retention management, etc.). In some examples, the memory sub-system 110 is a managed memory device, which is a raw memory device 130 having control logic (e.g., local media controller 138) on the die and a controller (e.g., the memory sub-system controller 115) for media management within the same memory device package. An example of a managed memory device is a managed NAND (MNAND) device.

In various examples, the memory device 130 includes a page buffer 136 (e.g., a memory page buffer). The page buffer 136 is employed in read and write operations for the memory device 130. The page buffer 136 is an intermediary storage area that temporarily holds data during the transfer between the memory sub-system controller 115 and the memory device 130. In situations where data is written to the memory device 130, the data is first loaded into the page buffer 136 from the memory sub-system controller 115. From the page buffer 136, the data is then programmed into the appropriate cells of the array 133. Conversely, during a read operation, retrieved data is first placed into the page buffer 136 (e.g., by the local media controller 138) before being sent to the memory sub-system controller 115.

In some examples, the local memory 119 includes an abnormal program sequence detector 121 (referred to as a detector herein for simplicity). In the example of FIG. 1, the detector 121 is implemented as software; in other examples, the detector 121 can be implemented using hardware, or as a combination of hardware and software. The detector 121 can be used to detect a program sequence fault on the memory device 130. The detector 121 can monitor the memory device 130 for defective program commands. Examples are disclosed herein in which the detector 121 is used to detect faulty program write sequences, in other examples, the detector 121 is used to detect other types of faulty program sequences, such as faulty read and erase program sequences on the memory device 130. Thus, the detector 121 can be used to detect a partial or invalid program command in any type of program sequence being implemented at a NAND type of memory device.

For example, to program data in the memory device 130, the host system 120 issues a write request to the memory sub-system controller 115. The memory sub-system controller 115 can process the write request to issue a program write command to a local media controller 138 of the memory device 130 to program the data into appropriate cells of the array 133, known as a program write operation. A program write sequence can be used to program one or more cells with the data based on the program write command. The detector 121 can initiate one or more timers and use one or more status register bits of the status register 137 to monitor the program write sequence for a partial or invalid program command and take appropriate program failure handling steps to protect the data.

The program write sequence can include a command phase, address phase, data phase, and program phase. During the command phase, the memory sub-system controller 115 can send a program write command to prepare the memory device 130 for the program write operation. The memory sub-system controller 115 sends the program write command using data lines 132 (e.g., DQ[7:0]) to the memory device 130.

During the address phase, the memory sub-system controller 115 sends one or more address cycles to the local media controller 138 specifying a location in the array 133 where the data is to be written. The memory sub-system controller 115 sends the address cycles, in some instances, using the data lines 132. After the address is latched, the memory sub-system controller 115 waits for a period of time, referred to as an address to data latch time ($t_{ADL}$) delay, so that the address is correctly latched and stabilized within the memory device 130 before data input can begin. Once, the $t_{ADL}$ delay has passed (or expired), the memory sub-system controller 115 sends the data, in some instances using the data lines 132 to the memory device 130, from which the data can be moved into the page buffer 136 by the local media controller 138. After the data has been transferred to the page buffer 136, the memory sub-system controller 115 issues (sends) a program start write command to the local media controller 138, in some instances, using the data lines 132 to initiate programming and thus transfer data out of the page buffer 136 into the cells of the array 133 according to the address cycles.

Figure 2A:
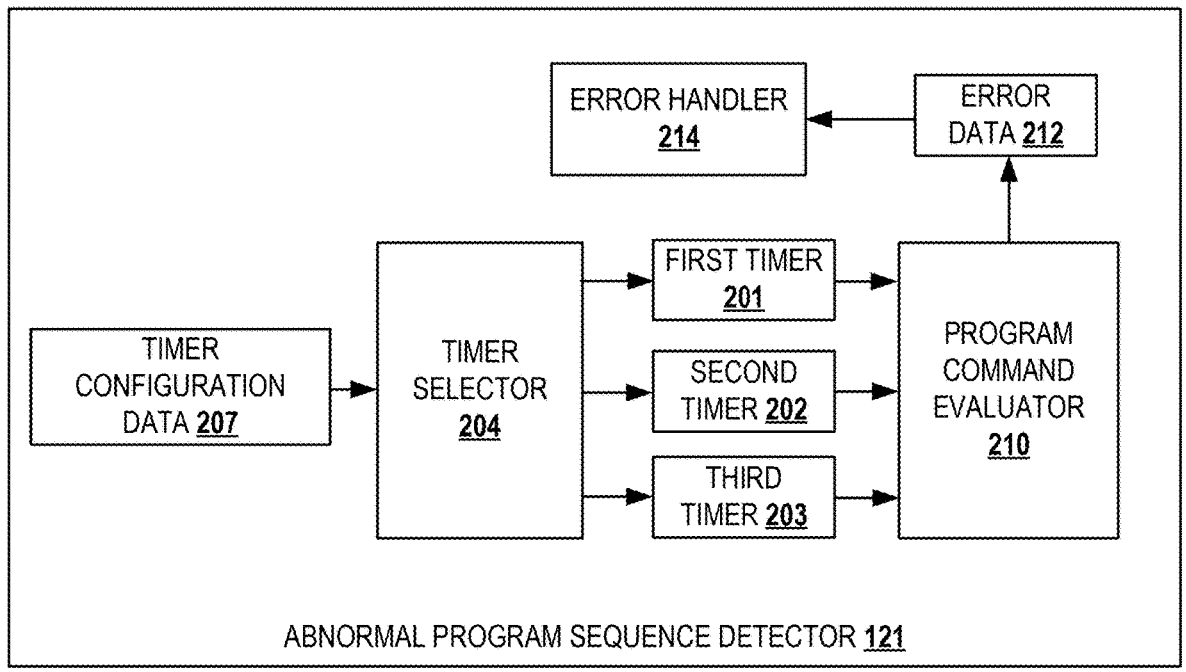
FIG. 2A illustrates a further example of the detector, as shown in FIG. 1.

In some instances, after issuing (or sending) the program start write command, the memory sub-system controller 115 starts one or more timers 201-203 of the detector 121, as shown in FIG. 2A, to monitor a state of the status register 137 to detect potential partial or invalid commands (e.g., partial or invalid page program command) in the program write sequence. In some instances, the detector 121 can include a timer selector 204 for selecting one or more of the timers 201-203 for use in detecting partial or invalid commands in the program write sequence. For example, the detector 121 can determine a type of program command that was issued by the memory sub-system controller 115. The detector 121 can select one or more timers from a set of timers (the timers 201-203) based on the determined type of program command. The detector 121 can start the selected timers. Thus, the detector 121 can start the selected timers in response to the memory sub-system controller 115 issuing a program command to the memory device 130.

For example, the detector 121 can initiate (e.g., start) a first timer 201 of the one or more timers 201-203 in response to a lower page or upper page write start program command being issued by the memory sub-system controller 115 to the memory device 130. The lower page or upper page program write start command causes the local media controller 138 to enter the busy state and the local media controller 138 updates the status register 137 to reflect that it is busy. The lower or upper page program write start command can be used to start programming of the data as lower page or upper data in the array 133. A first level of data written to a page is known as lower page data, whereas a second level of data written to the page is known as upper page data. In an MLC memory device, each cell can store more than one bit. The data stored in these cells is often organized into pages. Each page typically consists of a certain number of bytes, which are the smallest unit of data that can be read or written to the memory device 130. For example, each memory cell can store one or more bits of data. For example, the memory cell is a SLC, MLC, TLC, QLC, PLC, or a different type of memory cell. The memory sub-system controller 115 can issue a lower page or upper page program write start command to the local media controller 138 to initiate a lower or upper page program write operation and thus write the upper or lower page data to one or more cells of the array 133.

In some instances, the memory device 130 includes one or more additional bits, which can be referred to as a third page (or extra page). In such examples, the array 133 includes TLC, QLC, or PLC memory cells. The memory sub-system controller 115 can issue an extra page program write start command to start an extra page program write operation at the local media controller 138 to write extra page data to the third page (in the array 133). The extra page program write start command causes the local media controller 138 to enter a busy state and the local media controller 138 updates the status register 137 to reflect that the local media controller 138 is in the busy state. The detector 121 initiates a second timer 202 of the one or more timers 201-203 in response to the extra page program write start command being issued.

In yet further or additional examples, the memory device 130 can support cache programming and thus include a cache register 142 (also can be referred to as cache). Cache programming allows data to be loaded into a cache register 142 while previous data is being programmed into the memory cells of the array 133. Caching programming reduces an overall programming time by enabling continuous data transfer and minimizes idle time. Thus, in some examples, the memory sub-system controller 115 can issue an extra page cache program write start command to cause the local media controller 138 to perform an extra page cache program operation to writing data to an extra page (e.g., one or more bits) of the cache register 142, which can then be written to the cells of the array 133. The extra page cache program write start command causes the local media controller 138 to enter a busy state and the local media controller 138 updates the status register 137 to reflect that the local media controller 138 is in the busy state. The detector 121 initiates a third timer 203 of the one or more timers 201-203 in response to extra page cache program write start command being issued.

Generally, the memory device 130 has minimum busy times specified for the local media controller 138 so that the local media controller 138 has sufficient time to complete a program operation based on an architecture or specification for the memory device 130. The memory device 130 has a specified busy time for one or more program operations that can be performed by the memory device 130, such as the lower or upper page program operation, the extra page program operation and the extra page cache programming operation, as discussed herein. During busy times, that is, when the local media controller 138 is completing the program operation, the local media controller 138 is unavailable to process additional program operations, as a state machine 139 is in a busy state. In some examples, the local media controller 138 includes the state machine 139. The busy times can include a page buffer busy time ($t_{PBSY}$), a page program operation time ($t_{PROG}$) and a cache program operation time ($t_{CRDY}$). The page buffer busy time represents a minimum amount of time that is needed by the local media controller 138 to complete the lower or upper page program operation. The page program operation time represents a minimum amount of time that is needed by the local media controller 138 to complete the extra page program operation. The cache program operation time represents a minimum amount of time that is needed by the local media controller 138 to complete the extra page cache program operation.

Each of the first, second and third timers 201-203 has a timer duration that can be programmed (or set) to a busy time for a program operation, such as described herein. For example, the first timer 201 can have a first timer duration based on a length of the page buffer busy time, the second timer 202 can have a second timer duration based on a length of the page program operation time and the third timer 203 can have a third timer duration based on a length of the cache program operation time. For example, when the program operation time is 60 microseconds, the second timer 202 has a timer duration (or timeout period) of 60 microseconds.

In some examples, the timer duration of the timers 201-203 can be configurable based on the timer configuration data 207. That is, the timers 201-203 can have timer durations that can be set or configured according to different page program operations. Different types of program operations (e.g., NAND program operations, such as writing to SLC, TLC, or QPLC pages) can have specific timing requirement, which can be referred to as ideal or known time requirements. These time requirements ensure that a particular program operation has sufficient time to complete successfully. For example, the second timer 202 can be configured to 60 microseconds for an SLC page program, 300 microseconds for a TLC page program and 1.3 milliseconds for a QLC page program, etc., and thus aligning with a respective ideal page program operation time. Similarly, the first timer 201 can be set to 12 microseconds for both TLC and QLC page programs corresponding to the page buffer transfer time. The timer configuration data 207 can identify (ideal or specification defined) busy times for different busy check types for program commands that can be issued by the controller 115. The busy check type can specify different busy times (e.g., the page buffer transfer busy time, the page program operation time and the cache program operation time, for example). In yet some examples, the timer configuration data 207 can be represented as a table, such as table 300, as shown in FIG. 3.

FIG. 3 is an example of a timer configuration table 300. Each program command type is identified in table 300 with a timer group identifier (ID). The timer selector 204 can determine a type of program command that was issued (or to be issued) by the memory sub-system controller 115 and use the program command type to identify one or more busy check types for that program command using the timer configuration table 300 to identify busy times specified for that program command type. The busy times of the timer configuration table 300 (or the timer configuration data 207) can be referred to as ideal busy times or ideal operation times for processing a corresponding program command. The ideal busy times can be used in evaluating the program sequence for the program operation to determine whether program sequence is abnormal. For example, the program command identified by "ProgramCMDType1" in the table 300 can identify a lower and upper page write start program command and the "ProgramCMDType2" in table 300 can identify an extra page write start program command. For each of the program command types in the table 300, corresponding busy check types are identified. For example, for the "ProgramCMDType1" two busy check types are identified: CheckType1 and CheckType2 corresponding to the page buffer transfer busy time and the page program operation time. For the "ProgramCMDType2" in table 300 two busy check types are identified as well: CheckType1 and CheckType3 corresponding to the page buffer transfer busy time and the cache program operation time.

The state machine 139 is configured to manage a sequence of operations, such as needed to read from, write to and erase data from the memory cells of the array 133. The state machine 139 can update one or more status register bits, such as one or more operation state bits of the status register 137 for the program operation, such as the program write operation. In some memory device architectures, the one or more operation state bits are known as SR[5] and SR[6] bits. The SR[5] and SR[6] bits can have a default bit "1". The state machine 139 causes the one or more operation state bits to return to the default bit "1" in response to programming the memory cells of the array 133 with the data.

The detector 121 includes a program command evaluator 210 to check the program write sequence for abnormal program commands and thus determine that the program write sequence is abnormal. The program command evaluator 210 can monitor the one or more operation state bits in response to the program command being issued to detect when the local media controller 138 is in the busy state. For example, the program command evaluator 210 monitors the status register 137 to detect that the local media controller 138 is in the busy state when the one or more operation state bits have a bit value of "0". The program command evaluator 210 determines that the local media controller 138 is not in the busy state when the one or more operation state bits have the default bit "1".

In response to detecting that the local media controller 138 is not in the busy state, the detector 121 checks the program write sequence for an abnormality (e.g., a partial or invalid program command). For example, the program command evaluator 210 stops the selected timer for the program operation in response to determining that the local media controller 138 is not in the busy state. The program command evaluator 210 can check the selected timer to determine how much time has elapsed on the selected timer since being starting, which can be referred to as a checked operation time in response to stopping the selected timer. The checked operation time can represent a total amount of time has elapsed after (or since) the program command was issued until the one or more operation state bits return to the default bit "1" corresponding to the local media controller 138 being back in the non-busy state.

The program command evaluator 210 can compare the checked operation time to the ideal operation time for the program operation (as identified by the timer configuration data 207 or the table 300) to determine whether the programming operation was abnormal. As discussed herein, the ideal operation time is a defined amount of time that is needed for the local media controller 138 to perform a program operation. The program command evaluator 210 can determine that the program operation was normal in response to determining that the checked operation time is greater than the ideal operation time and thus determine that program command was successful at the local media controller 138 (e.g., likely processed by the local media controller 138).

In some examples, the program command evaluator 210 determines that the checked operation time is less than the ideal operation time indicative of an abnormal program operation and thus of an abnormal program sequence at the memory device 130. In examples in which the program command evaluator 210 determines that the program sequence is abnormal based on the checked operation time being less than the ideal operation time this can be referred to as a first error type and can indicate that the program command was corrupted and the memory device 130 received a partial program command. In some examples, the program command evaluator 210 determines that the checked operation time is greater than ideal operation time by a factor and this is also indicative of an abnormal program sequence. The factor is a predetermined amount of time, such as a factor of 3 (e.g., 3 times) or a different amount. In examples in which the program command evaluator 210 determines that the program sequence is abnormal based on the checked operation time being greater than the ideal operation time by a factor of three or more this can be referred to as a second error type and can indicate that the program command is invalid and the memory device 130 did not process the program command.

The program command evaluator 210 can output different types of errors, such as the first and second error types as error data 212 based on an evaluation of the checked operation time and the ideal operation time, as disclosed herein. The detector 121 can include an error handler 214. In some examples, the error handler 214 can claw back data from system memory (e.g., SRAM or DRAM) and reprogram the data to another block in the array 133 based on the error data 212. For example, if the error data 212 identifies a first error type, the error handler 214 can cause the memory sub-system controller 115 to issue a new program command for programming the data into another block in the array 133.

As disclosed herein, the program command issued by the memory sub-system controller 115, in some scenarios, can be become corrupted due to signal integrity issues, which results in an abnormal program sequence at the local media controller 138, as program commands issued by the memory sub-system controller become corrupted. In some examples, if the memory sub-system controller 115 issues the program command while the local media controller 138 is still busy (e.g., processing the prior program command), the local media controller 138 may not acknowledge the new program command. In these scenarios, the one or more operation state bits will still have a default bit "1" and program operation status bits of the status register 137 (in some memory device architectures identified as SR[0] and SR[1]) will still have the default state "0" as no error condition was detected by the local media controller 138. No error condition is detected by the local media controller 138 because the program command was not processed. As such, this causes the memory sub-system controller 115 to falsely assume that the program command was successfully executed at the local media controller 138, which leads to an invalid program sequence at the memory device 130. Such incomplete or invalid program sequences can result in a data loss event for a host read. For example, when the host system 120 attempts to read data from the memory device 130, the data in the cells of the array 133 may be incorrect, corrupted, or invalid. This causes the host system 120 to make a false data read, as the host system 120 receives unexpected or incomplete data. Existing solutions rely on a FW team to validate, debug, flag and fix issues leading to abnormal writes sequences. By using the detector 121 in the memory sub-system 110, abnormal program sequences can be detected, which reduces a likelihood of data loss during host system reads. Furthermore, the use of the detector 121 in the memory sub-system 110 allows for defects or software bugs to be detected in early stages of memory device production (or testing).

Figure 2B:
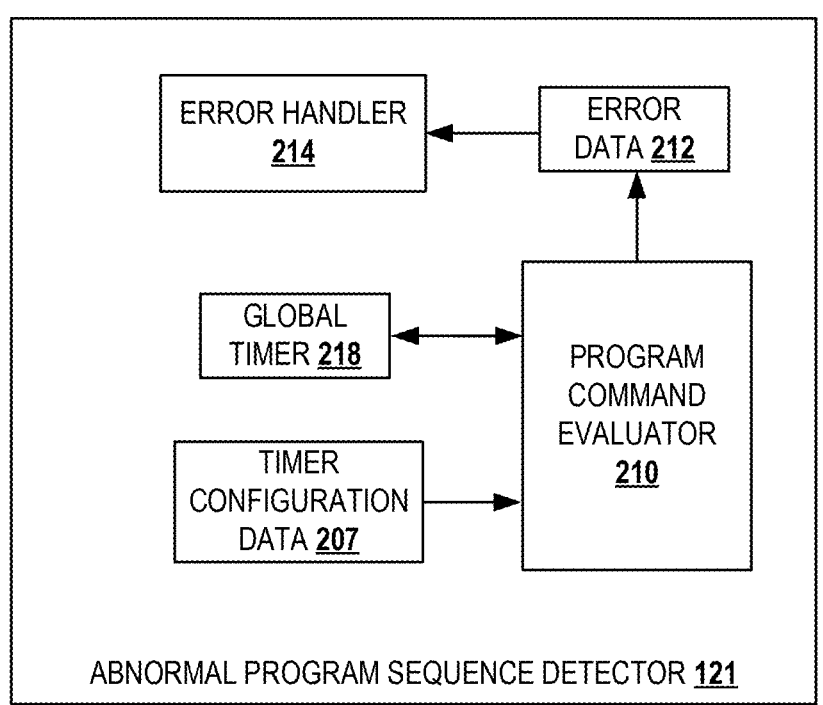
FIG. 2B illustrates yet another example of the detector, as shown in FIG. 1.

In some examples, the detector 121 can be configured to monitor one or more different program (or command) sequences for abnormalities of the memory device 130 or the memory device 140. In such examples, the detector 121 can be implemented according to one or more examples, as disclosed herein, with respect to FIG. 2B. FIG. 2B is an example of the detector 121 that has been configured to monitor program sequences for abnormalities in the memory device 130 or the memory device 140. Example program sequences can include, but not limited to, a page program sequence, a cache program sequence, etc. For example, the detector 121 can use a global timer 218 (or a single timer) for monitoring and verifying a completion of different program operations (e.g., NAND memory operations) at the memory device 130 or the memory device 140 by comparing actual operation times to predefined ideal time values. The global timer 218 can be implemented as hardware, software, or a combination thereof.

For example, the detector 121 or the controller 115 can receive different ideal time values (ideal busy times or expected busy times) that are specific to various types of program operations, such as NAND memory operations. These ideal time values can correspond to expected program operation durations for different program operations, such as $t_{PROG}$ for the page program operation time and $t_{PBSY}$ for the page buffer busy transfer time, as an example. These values can serve as benchmarks against which actual operation durations are compared by the detector 121. In some examples, the timer configuration data 207 can include the ideal busy times for different busy check types (e.g., the page buffer transfer busy time, the page program operation time and the cache program operation time, for example). The ideal busy times can be referred to as defined times for different program operations of one or more program sequences. Accordingly, the timer configuration data 207 can identify one or more different busy check types for various program sequences.

The detector 121 utilizes the global timer 218 to track a duration of each command sequence. In some examples, the global timer 218 is continuously running, in other examples, the controller 115 initiates the global timer 218 before issuing a program command. For example, the controller 115 can initiate a timing process to either start the global timer 218 (in other examples one of the first, second and third timers 201-203, as disclosed herein), or record an initial timer value. When a program command is issued (e.g., a write operation) by the controller 115, the detector 121 captures (or records) a start timestamp (X) (the initial timer value) from the global timer 218. In some examples, the detector 121 captures the start timestamp in response to detecting the issued program command or the program command being issued. The program command causes the memory device 130 or the memory device 140 to implement a program operation, such as disclosed herein, as an example. The detector 121 monitors or checks the status register 137 in response to starting the global timer 218 to determine whether the memory device 130 or 140 is in a busy state corresponding to implementing the program operation. For example, the detector 121 monitors one or more operational bits of the status register 137, such as the RDY bit, which indicates whether the memory device 130 or the memory device 140 is in a busy state. The detector 121 detects using the status register 137 that the memory device 130 or the memory device 140 is not in the busy state in response to starting the global timer 218. For example, the detector 121 detects that the RDY bit has a bit value of "1", which indicates that the local media controller 138 is ready for a new program command from the controller 115. Thus, upon completion of the program operation, in some instances, the memory device 130 or the memory device 140 signals (or notifies) the detector 121. The detector 121 records (or captures) an end timestamp (Y) (a current timer value) from the global timer 218 in response to determining that the memory device 130 or the memory device 140 is not in the busy state based on the status register 137.

The detector 121 determines a duration of the program operation, which can correspond to an actual busy time of the program operation. For example, the duration of the program operation can be determined based on the start and end timestamps (e.g., Y-X). For example, the detector 121 can subtract the initial timer value from the current timer value to provide the actual busy time. Example actual busy times can include, but not limited to, an actual page buffer transfer busy time, actual page program operation time, actual cache program operation time, etc. In some examples, the actual busy time of the program operation can be referred to as a checked operation time for the program operation. The detector 121 compares the checked operation time and a defined operation time (from the timer configuration data 207) for the program operation to determine whether a program sequence for implementing the program operation was abnormal.

By way of example, if the actual busy time (actual program operation time) is less than an ideal busy time this indicates an abnormal operation and thus an abnormal program sequence. Such scenarios occur when a program operation is completed too quickly, suggesting an error or incomplete processing. The detector 121 can output the error data 212 including a first error type. The first error type can indicate that the actual busy time is less than the ideal busy time for the program operation. In some examples, if the actual busy time is significantly longer than the ideal busy time by a factor, where the factor can be defined as a threshold (e.g., three times the ideal busy time) this also indicates an abnormal operation. Such scenarios occur when the memory device 130 or the memory device 140 hangs (e.g., because the memory device is busy processing a previous program command) or malfunctions. The detector 121 can output the error data 212 with a second error type. The second error type can indicate that the actual busy time is far longer than the ideal busy time for the program operation. In some examples, the detector 121 can output the error data 212 with a third error type in response to determining that the program operation failed based on the status register 137. In some examples, if the actual busy time falls within an acceptable range for the program operation this can be considered normal, meeting expected timing requirements. The acceptable range can be defined based on the ideal busy time and maximum acceptable ideal busy time. The maximum acceptable busy time can be a multiple (a factor) of the ideal busy time and thus can define an upper limit or bound of the acceptable range, whereas a lower limit is defined by the ideal busy time.

In some examples, the detector 121 uses the error handler 214 to claw back data from system memory (e.g., SRAM or DRAM) and reprogram the data to another block in the array 133 based on the error data 212. For example, if the error data 212 identifies a first error type, the error handler 214 can cause the memory sub-system controller 115 to issue a new program command for programming the data into another block in the array 133.

Figure 4:
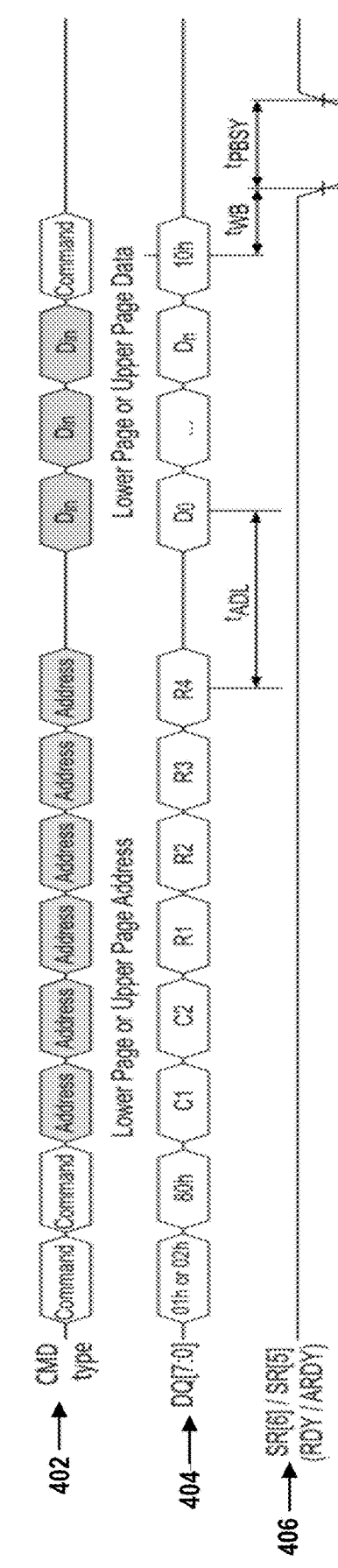
FIG. 4 illustrates an example of a page program sequence for implementing an upper- or lower-page program operation.

FIG. 4 illustrates an example of an upper- or lower-page program sequence 400 for implementing an upper or lower page program operation at a memory device, such as the memory device 130, in some instances. The upper- or lower-page program sequence 400 includes a sequence of commands, such as 01h (or 02h), 80h and 10h commands for programming data to either a lower or upper page in the array 133. The upper- or lower-page program sequence 400 includes a cycle type portion 402, a data transfer phase portion 404 and an operational state portion 406.

The cycle type portion 402 includes command cycles, address cycles and data cycles. A command cycle is a phase in an operation (e.g., a page program write operation) where a command is issued to a memory device to perform an operation. An address cycle is a phase in the operation where an address of a memory location where the operation is to be performed is provided. A data cycle is a phase in the operation where data to be written or read is transferred. The data transfer phase portion 404 identifies commands (e.g., 01h, 80h and 15h commands), addresses (e.g., C1, C2, R1, R2, R3 and R4), for example, for lower or upper page addresses and data (e.g., $D_0$ and $D_n$) that is to be transferred (e.g., over a data bus). The commands, addresses and data can be transferred over lines identified as "DQ" in the example of FIG. 4 and can be 8 bits wide [7:0]. The operational state portion 406 includes RDY and ARDY signals corresponding to operation state bits SR[5] and SR[6] of the status register 137.

As shown in FIG. 4, when the 10h command is issued in the upper- or lower-page program sequence 400 this starts the programming of upper or lower page data into the cells of the array 133. The amount of time needed for the local media controller 138 to load the upper- or lower-page data for programming into the page buffer 136 is referred to as a write buffer time and is identified in the example of FIG. 4 as "$t_{WB}$". At about an end of the write buffer time, the local media controller 138 updates the operation state bits from a default bit value of "1" to a low bit value "0" to indicate that the local media controller 138 is writing the upper- or lower page data from the page buffer 136 to the array 133. Once the lower- or upper-page data is programmed into the array 133, the local media controller 138 causes the operation state bits to return to the default bit value to indicate that the local media controller 138 is available for another program command. In the example of FIG. 4, $t_{PBSY}$ represents a time interval during which the local media controller 138 is transferring data from the page buffer 136 to the array 133 and can be referred to as an actual page buffer transfer busy time.

As disclosed herein, the detector 121 can start the first timer 201 (also can be referred to as "T_PBSYchk"). The detector 121 starts the first timer 201 in response to the memory sub-system controller 115 issuing the 10h command to the local media controller 138 to start writing the upper- and lower page data to the array 133. The detector 121 monitors the status register 137 to detect an operational state (e.g., a busy or non-busy state) of the memory device 130 (or the local media controller 138) in response to starting the first timer 201. The local media controller 138 updates the operation state bits to the default bit "1" to indicate that the transfer of the upper- or lower page data from the page buffer 136 to the array 133 is complete. The detector 121 stops the first timer 201 in response to detecting that operation state bits SR[5] and SR[6] have default bit values corresponding to detecting that the memory device 130 is not in the busy state.

The detector 121 determines the duration of the page buffer transfer busy time, as shown in FIG. 4, based on an amount of time recorded by the first timer 201, which can be referred to as an actual page buffer transfer busy time. The detector 121 evaluates the actual page buffer transfer busy time and the ideal page buffer transfer busy time to determine whether the page program operation was abnormal. For example, if the ideal page buffer transfer busy time is less than the actual page buffer transfer busy time this can indicate that the 10h command was not processed by the local media controller 138 corresponding to an abnormal page program operation for the upper or lower page program sequence 400.

Figure 5:
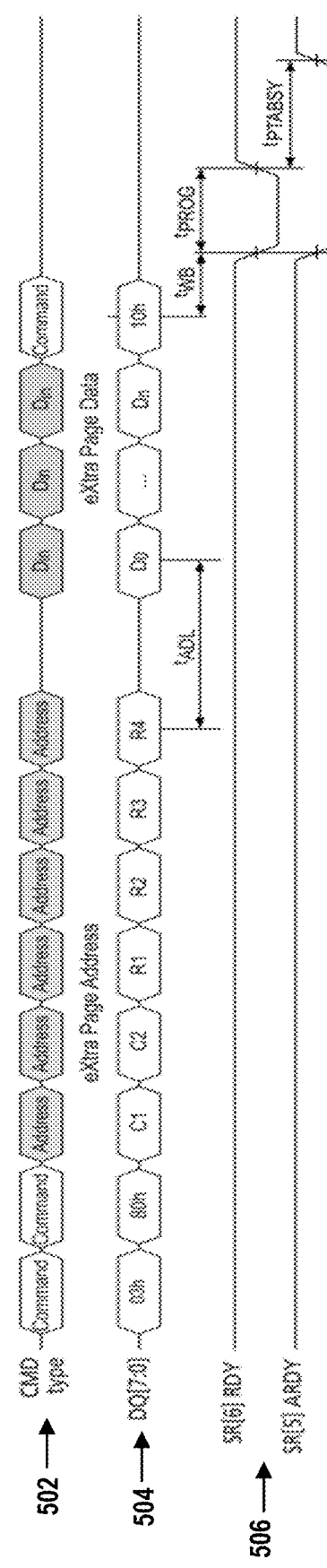
FIG. 5 illustrates an example of a page program sequence for implementing an extra page program operation.

FIG. 5 illustrates an example of an extra page program sequence 500 for implementing an extra page program operation at a memory device, such as the memory device 130 in some instances. The extra page program sequence 500 includes a sequence of commands, such as 03h, 80h and 10h commands for programming data to an extra page in the array 133. The extra page program operation sequence 500 includes a cycle type portion 502, a data transfer phase portion 504 and an operational state portion 506.

The cycle type portion 502 includes command cycles, address cycles and data cycles. The data transfer phase portion 504 identifies commands (e.g., 03h, 80h and 10h commands), extra page addresses (e.g., C1, C2, R1, R2, R3 and R4), for example, for an extra page in the array 133 and data (e.g., $D_0$ and $D_n$) that is to be transferred (e.g., over a data bus). The commands, addresses and data can be transferred over lines identified as "DQ" in the example of FIG. 5 and can be 8 bits wide [7:0]. The operational state portion 506 includes RDY and ARDY signals corresponding to operation state bits SR[5] and SR[6] of the status register 137.

As shown in FIG. 5, when the 10h command is issued in the extra page program sequence 500 this initiates the programming of extra page data into the cells of the array 133. An amount of time needed for the local media controller 138 to load the extra page data for programming into the page buffer 136 is referred to as a write buffer time and is identified in the example of FIG. 5 as "$t_{WB}$". At about an end of the write buffer time, the local media controller 138 updates the operation state bits from a default bit value of "1" to a low bit value "0" to indicate that the page program operation is being performed by the local media controller 138 to program the extra page data from the page buffer 136 into one or more extra pages of the array 133. Once the page program operation is complete, the local media controller 138 updates operation state bits to the default bit value. In the example of FIG. 5, $t_{PROG}$ represents a timer interval during which the local media controller 138 is programming the extra page data into the cells (e.g., extra page(s)) of the array 133) and can be referred to as a page program operation time. During the page program operation time the local media controller 138 is unable to process additional new program commands. A page transfer and busy time ($t_{PTABSY}$) in FIG. 5 represents an additional busy time during which the local media controller 138 is implementing one or more post programming operations.

As disclosed herein, the detector 121 can start the second timer 202 (also can be referred to as "T_PROGchk"). The detector 121 starts the second timer 202 in response to the memory sub-system controller 115 issuing the 10h command. The detector 121 monitors the status register 137 to detect an operational state (e.g., a busy or non-busy state) of the memory device 130 (or the local media controller 138) in response to starting the second timer 202. The local media controller 138 updates the operation state bit SR[5] to the default bit value "1" to indicate that the extra page has been programmed into the array 133. The detector 121 stops the second timer 202 in response to detecting the operation state bit SR[5 has the default bit value "1". The detector 121 determines the duration of the page program operation time, as shown in FIG. 5, based on an amount of time recorded by the second timer 202, which can be referred to as an actual page program operation time. The detector 121 evaluates the actual page program operation time and the ideal page program operation time to determine whether the extra page program operation was abnormal. For example, if the ideal page program operation time is less than the actual page program operation time this can indicate that the local media controller 138 did not process the 10h command corresponding to an abnormal extra page program operation for the extra page program sequence.

Figure 6:
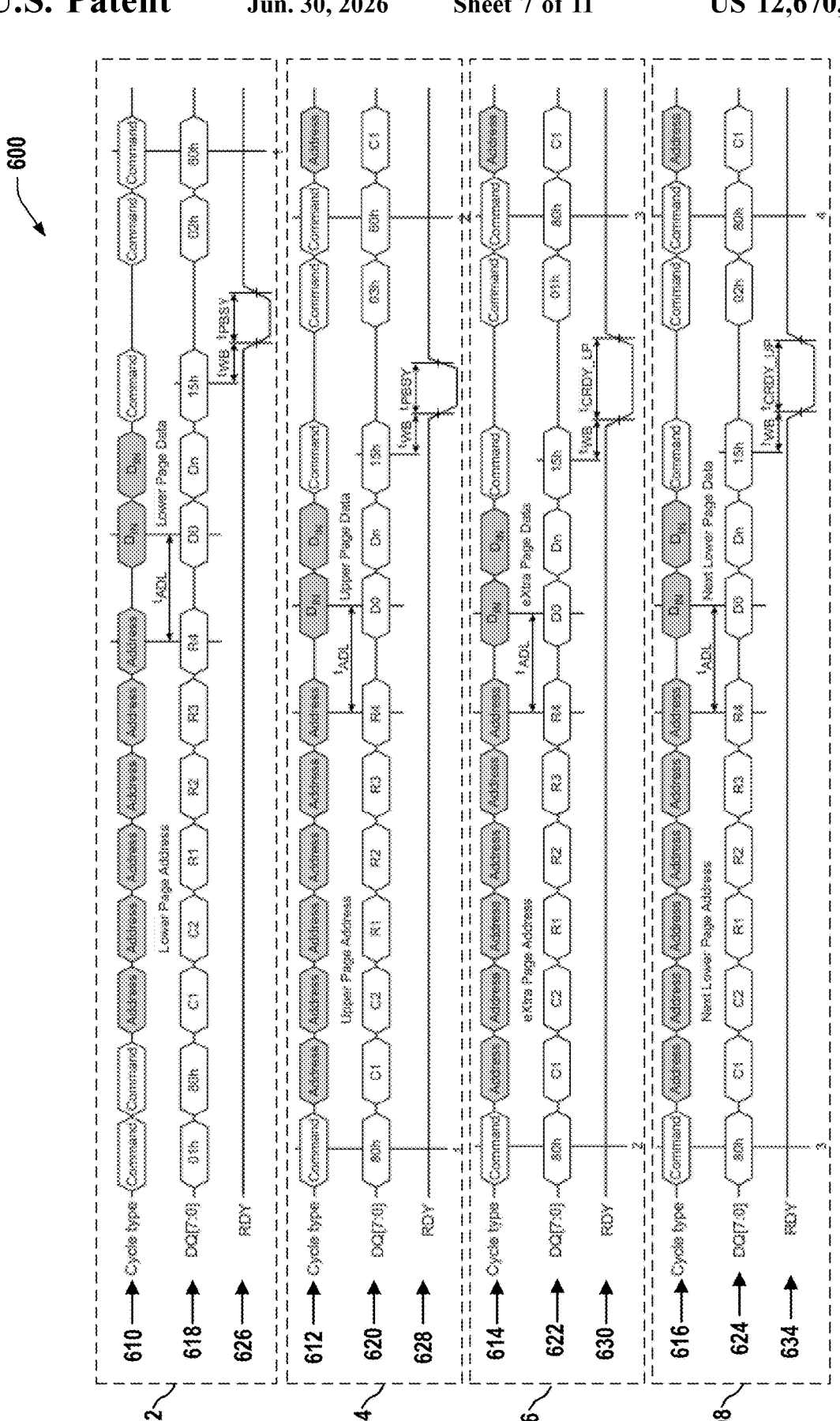
FIG. 6 illustrates an example of additional page program sequences.

FIG. 6 illustrates an example of page program sequences 602-608 that can be implemented at a memory device, such as the memory device 130, in some instances. The first page program sequence 602 is a lower page program sequence and the second page program sequence 604 is an upper page program sequence. Each of the program sequences 602-608 include commands that are involved in causing the memory device 130 to program data (e.g., lower page data, upper page data, extra page data and additional lower page data) to one or more pages in the array 133. The program sequences 602-608 each include a respective cycle type portion 610-616, a respective data transfer phase portion 618-624 and a respective operational state portion 626-634.

Each of the cycle type portions 610-616 include command cycles, address cycles and data cycles. Each of the data transfer phase portions 618-618 identify commands (e.g., one or more of 01h, 80h, 15h, 02h, 03h commands), page addresses (e.g., lower page address, upper page address or additional lower page address) and data (e.g., lower page data, upper page data, extra page data, or additional lower page data) that is to be transferred (e.g., over a data bus). The commands, addresses and data can be transferred over lines identified as "DQ" in the example of FIG. 6 and can be 8 bits wide [7:0]. Each operational state portion 626-634 includes RDY signals corresponding to an operation state bit SR[5] of the status register 137.

As shown in FIG. 6, for example, when the 15h command is issued in each of the program sequences 602-608 this starts programming of corresponding page data into the cells of the array 133. An amount of time needed for the local media controller 138 to load corresponding page data for programming into the page buffer 136 is referred to as a write buffer time and is identified in the example of FIG. 6 as "$t_{WB}$" each of the page program sequences 602-608.

In some examples, at about an end of the write buffer time, for the page program sequences 602-604, the local media controller 138 updates the operation state bit SR[5] from its default bit value of "1" to a low bit value "0", which indicates that the page program operation is being performed by the local media controller 138 to program the corresponding page data from the page buffer 136 into one or more pages of the array 133. Once the page program operation is complete using the page buffer 136 for programming, the local media controller 138 causes the operation state bit SR[5] to return to its default bit value, as shown in program sequences 602-604. In the example of FIG. 6, $t_{PBSY}$ represents a time interval during which the local media controller 138 is transferring data from the page buffer 136 to the array 133 and can be referred to as an actual page buffer transfer busy time.

In some examples, at about an end of the write buffer time, for the page program sequences 606-608, the local media controller 138 updates the operation state bit SR[5] from its default bit value of "1" to a low bit value "0", which indicates that the page program operation is being performed by the local media controller 138 to program the corresponding page data from the cache register 142 (or cache) into one or more pages of the array 133. Once the page program operation is complete using the cache register 142 for programming, the local media controller 138 causes the operation state bit SR[5] to return to its default bit value, as shown in program sequences 606-608. In the example of FIG. 6, $t_{CRDY\_LP}$ and $t_{CRDY\_UP}$ represent respective time intervals of the program sequences 606-608 during which the local media controller 138 is transferring page data (e.g., extra (or upper) page data and lower page data) from the cache register 142 to the array 133 and can be referred to as a cache program operation time.

For example, as disclosed herein, the detector 121 can start the third timer 203 (also can be referred to as "T_CRDYchk"). The detector 121 starts the third timer 203 in response to the memory sub-system controller 115 issuing the 15h command to the local media controller 138. The detector 121 monitors the status register 137 to detect an operational state (e.g., a busy or non-busy state) of the memory device 130 (or the local media controller 138) in response to starting the third timer 203. The local media controller 138 updates the operation state bit SR[5] to the default bit value "1" (from "0"), which indicates that the transfer of the page data from the cache register 142 to the array 133 is complete. The detector 121 stops the third timer 203 in response to detecting that the operation state bit SR[5] has the default bit value "1". For each program sequence 606-608, the detector 121 determines the duration of the cache program operation time, as shown in FIG. 6, based on an amount of time recorded by the third timer 203, which can be referred to as an actual cache program operation time. The detector 121 evaluates the actual cache program operation time and the ideal cache program operation time to determine whether the first or the second page program cache operation was abnormal. For example, if the ideal cache program operation time is less than the actual cache program operation time this can indicate that the local media controller 138 did not process the 15h command corresponding to an abnormal page program cache operation for the page program sequence 606 or the page program sequence 608.

FIG. 7 illustrates a flowchart of an example method 700 for detecting an abnormal page program sequence at a memory device, such as the memory device 130, as shown in FIG. 1. The method 700 can be executed by a memory sub-system, such as the memory sub-system 110. Thus, one or more steps of the method 700 can be executed by the detector 121 of the memory sub-system 110. At block 702, a timing process is initiated by starting a timer (e.g., one of the timers 201, 202 or 203 of FIG. 2A or the timer 218 of FIG. 2B) or recording an initial timer value from the timer. At block 704, the status register 137 of the memory device 130 is checked to determine whether the memory device 130 is in a busy state corresponding to implementing a program operation in response to initiating the timing process. At block 706, the timer is stopped or a recording of a current timer value is made from the timer in response to determining that the memory device 130 is not in the busy state. At block 708, a determination is made as to how much time has elapsed on the timer since being started in response to the stopping or based on the initial and current timer values to provide a checked operation time. At block 710, the checked operation time and the defined operation time are evaluated (e.g., according to one or more examples, as disclosed herein) to determine whether a program sequence for implementing the program operation was abnormal.

Figure 8:
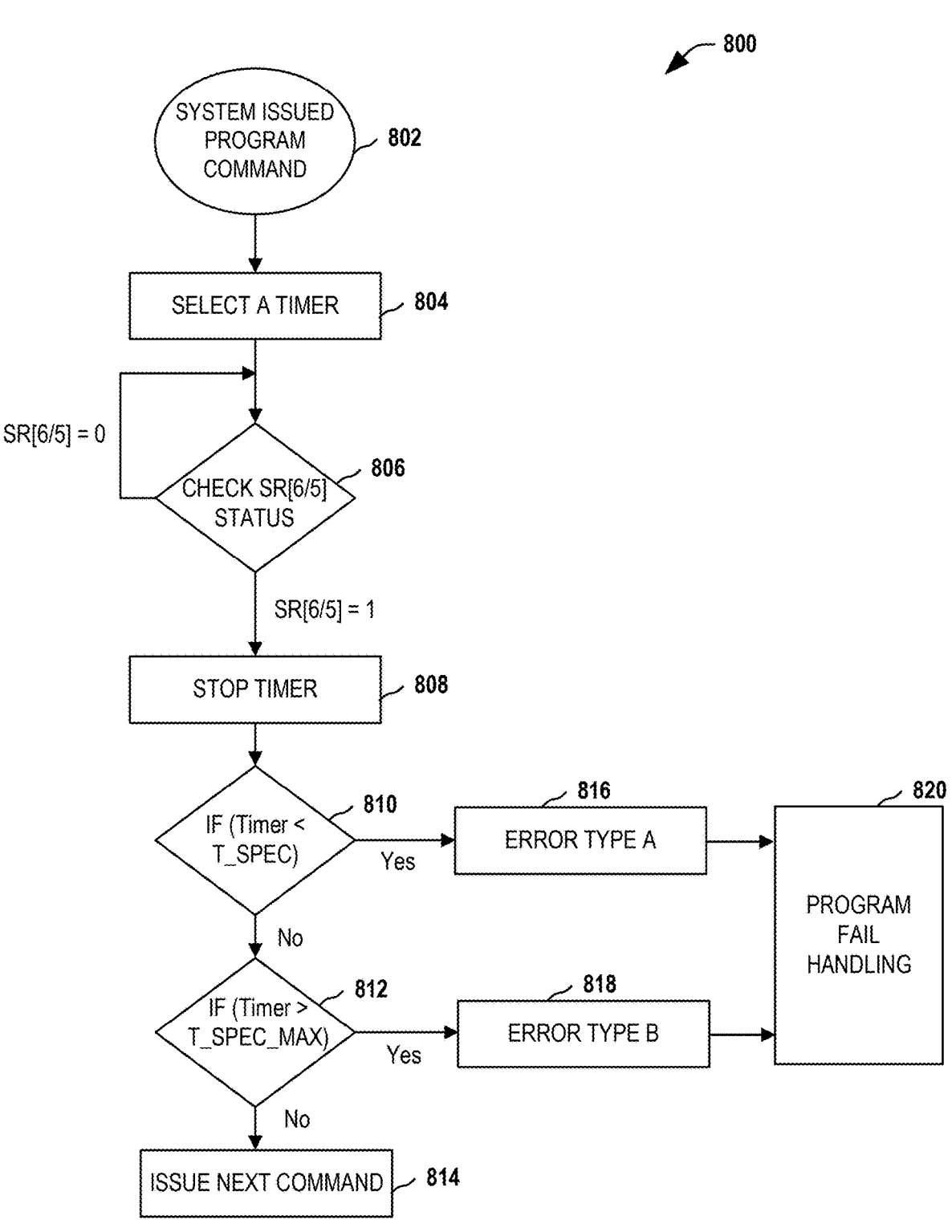
FIG. 8 illustrates a flowchart of another example method for detecting an abnormal page program sequence.

FIG. 8 illustrates a flowchart of another example method 800 for detecting an abnormal page program sequence at a memory device, such as the memory device 130, as shown in FIG. 1. The method 800 can be executed by a memory sub-system, such as the memory sub-system 110. Thus, one or more steps of the method 800 can be executed by the detector 121 of the memory sub-system 110. At block 802, the memory sub-system controller 115 issues a page program command to the memory device 130 to perform a page program operation. At block 804, the detector 121 selects a timer of the timers 201-203 based on a type of page program command that is issued by the memory sub-system controller 115 and the timer configuration data 207. In some examples, at block 804, the detector 121 starts the timer. At block 806, the detector 121 checks status operational bits SR[5] and SR[6] of the status register 137 on the memory device 130 to determine whether the memory device 130 is in a busy state corresponding to implementing the page program operation. The method 800 returns back to block 804 in response to the status operational bits SR[5] and SR[6] having a bit value of "0" as shown in FIG. 8. In other examples, the method 800 proceeds to block 808 in response to the status operational bits SR[5] and SR[6] having a bit value of "1" as shown in FIG. 8.

At block 808, the detector 121 stops the timer in response to determining that the status operational bits SR[5] and SR[6] having the bit value of "0" and calculates how much time has elapsed on the timer since being started to provide a checked operation time (known as "Timer" in FIG. 8). At block 810, the detector 121 determines whether the checked operation time is less than a defined operation time (known as "T_SPEC" in FIG. 8). If the checked operation time is greater than the defined operation time (identified as "No" in FIG. 8), the method 800 proceeds to block 812, at which the detector 121 determines whether the checked operation time is greater than the defined operation time by a factor (identified as "T_SPEC_MAX" in FIG. 8). If the checked operation time is not greater than the defined operation time by the factor (identified as "No" in FIG. 8), the method 800 can proceed to block 814 and the detector 121 can alert or notify the memory sub-system controller 115 to issue a next page program command, as the page program operation was not abnormal.

In some examples, at block 810, the detector 121 determines that the checked operation time is less than the defined operation time (identified as "Yes" in FIG. 8) and the method 800 proceeds to block 816. At block 816, the detector 121 indicates that an error type A has occurred in response to determining that the checked operation time is less than or equal to defined operation time, which can correspond to a first error type, as disclosed herein. In some examples, at block 812, the detector 121 determines that the checked operation time is greater than the defined operation time by the factor (identified as "Yes" in FIG. 8). At block 818, the detector 121 indicates that an error type B has occurred in response to determining that the checked operation time is greater than the defined operation time by the factor, which can correspond to a second error type, as disclosed herein. As shown in FIG. 8, from block 816 or block 818, the method 800 can proceed to block 820 to perform an appropriate program fail handling mechanism based on an error type. For example, at block 820, the detector 121 can set (or flag) one or more error status bits for one or more systems to trigger appropriate data recovery protocols to recover from a defective or corrupted program operation to protect data integrity in response to determining the program sequence is abnormal.

Figure 9:
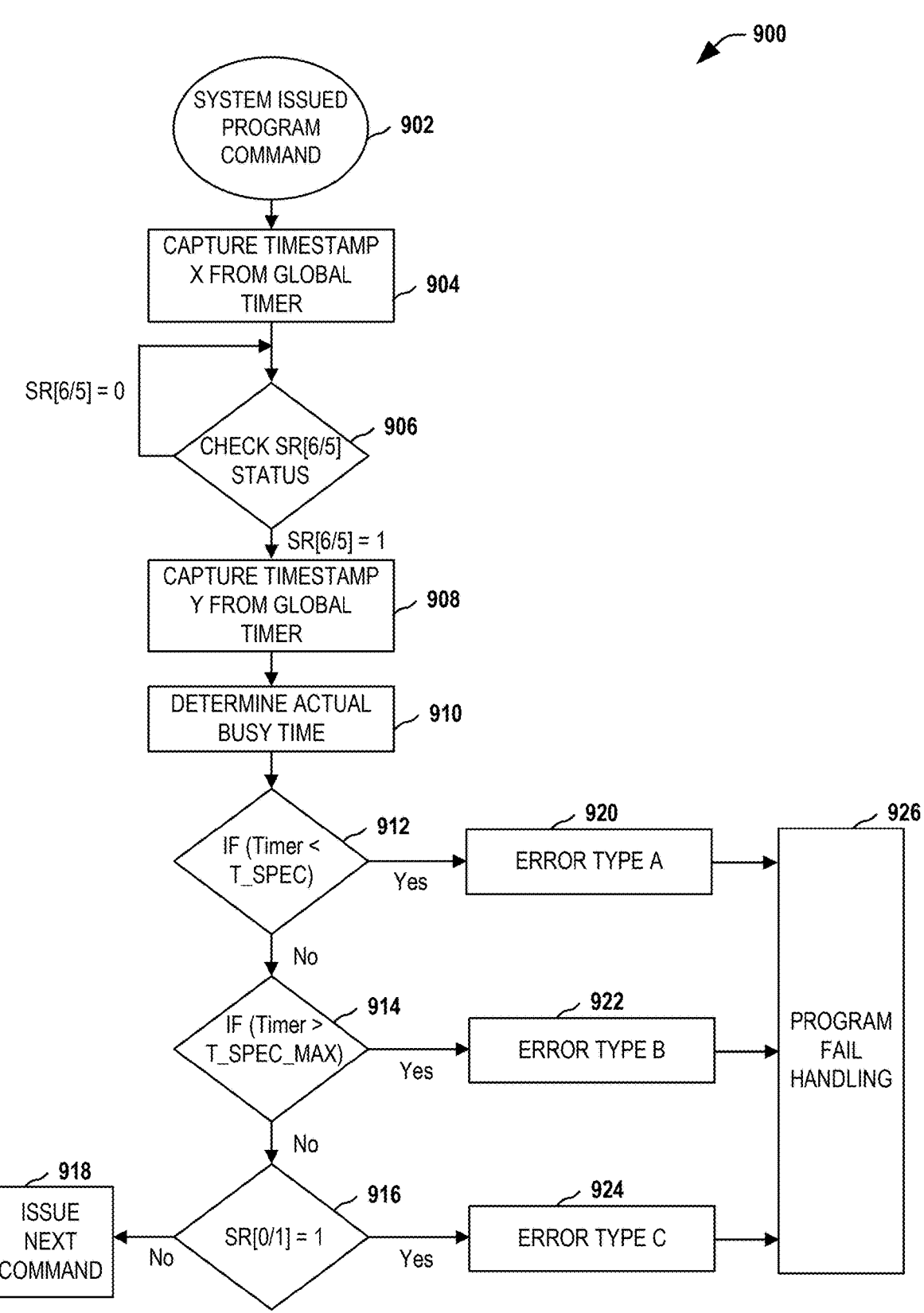
FIG. 9 illustrates a flowchart of yet another example method for detecting an abnormal page program sequence.

FIG. 9 illustrates a flowchart of another example method 900 for detecting an abnormal page program sequence at a memory device, such as the memory device 130, as shown in FIG. 1. The method 900 can be executed by a memory sub-system, such as the memory sub-system 110. Thus, one or more steps of the method 900 can be executed by the detector 121 of the memory sub-system 110. At block 902, the memory sub-system controller 115 issues a program command to the memory device 130 to perform a program operation. At block 904, the detector 121 captures a start timestamp (X) from the global timer 218 in response to the program command being issued. At block 906, the detector 121 checks status operational bits SR[5] and SR[6] of the status register 137 of the memory device 130 to determine whether the memory device 130 is in a busy state corresponding to implementing the program operation. The method 900 returns back to block 904 in response to the status operational bits SR[5] and SR[6] having a bit value of "0" as shown in FIG. 9. In other examples, the method 900 proceeds to block 908 in response to the status operational bits SR[5] and SR[6] having a bit value of "1" as shown in FIG. 9.

At block 908, the detector 121 captures an end timestamp (Y) from the global timer 218 in response to determining that the memory device 130 is not in the busy state. At block 910, the detector 121 determines a duration of the program operation based on the start and end timestamps corresponding to an actual busy time of the program operation or a checked operation time (known as "Timer" in FIG. 9).

At block 912, the detector 121 determines whether the checked operation time is less than a defined operation time (known as "T_SPEC" in FIG. 9) for that program operation. If the checked operation time is greater than the defined operation time (identified as "No" in FIG. 9), the method 900 proceeds to block 912, at which the detector 121 determines whether the checked operation time is greater than the defined operation time by a factor (identified as "T_SPEC_MAX" in FIG. 9). If the checked operation time is not greater than the defined operation time by the factor (identified as "No" in FIG. 9), the method 900 can proceed to block 914. At block 914, the detector 121 determines whether the program operation failed at the memory device 130. For example, the detector 121 can check (or read) program operation status bits of the status register 137. In some memory device architectures, the program operation status bits are identified as SR[0] and SR[1], as in the example of FIG. 9. The program operation failed at the memory device 130 in response to the detector 121 detecting that the one or more program operation status bits indicate an error condition (e.g., have a bit value of "1"). If the detector 121 determines no error in the program operation, the method 900 can proceed from block 916 to block 918. At block 918, the detector 121 can alert or notify the memory sub-system controller 115 to issue a next page program command, as the page program operation was not abnormal.

In some examples, at block 912, the detector 121 determines that the checked operation time is less than the defined operation time (identified as "Yes" in FIG. 9) and the method 900 proceeds to block 920 from block 912. At block 920, the detector 121 outputs an error type A (corresponding to a first error type, as disclosed herein) indicating that the checked operation time is less than the defined operation time. In some examples, at block 914, the detector 121 determines that the checked operation time is greater than the defined operation time by the factor (identified as "Yes" in FIG. 9) and the method 900 proceeds to block 922 from block 914. At block 922, the detector 121 outputs an error type B (corresponding to a second error type, as disclosed herein) indicating that the checked operation time is greater than the defined operation time by the factor. In some examples, at block 916, the detector 121 determines that the program operation has failed and the method 900 proceeds to block 924 from block 916. At block 924, the detector 121 outputs an error type C (corresponding to a third error type, as disclosed herein) indicating that the program operation has failed. As shown in FIG. 9, from block 920, 922, or block 924, the method 900 can proceed to block 926 to perform an appropriate program fail handling mechanism based on an error type. For example, at block 926, the detector 121 can set (or flag) one or more error status bits for one or more systems to trigger appropriate data recovery protocols to recover from a defective or corrupted program operation to protect data integrity in response to determining the program sequence is abnormal.

Figure 10:
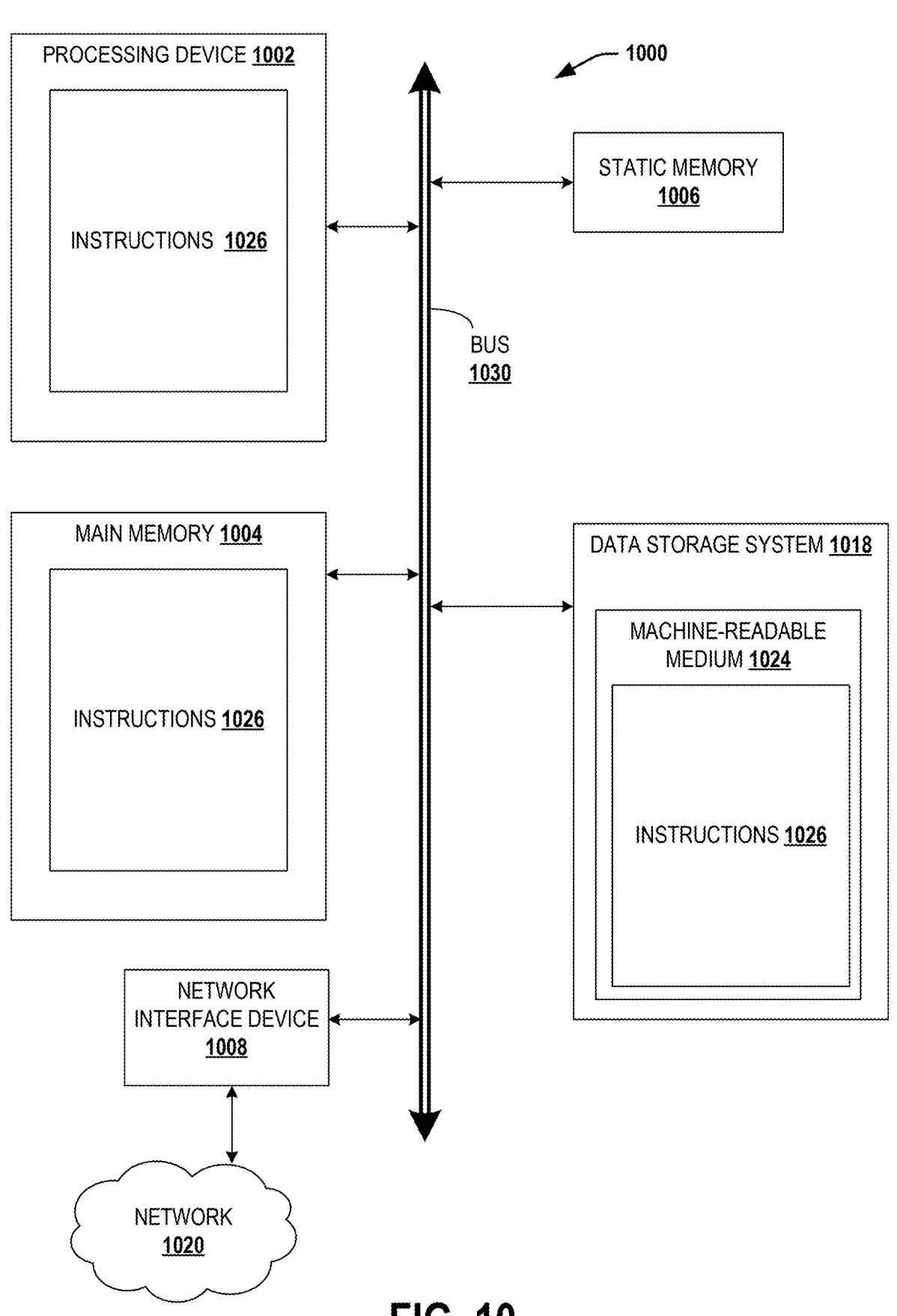
FIG. 10 illustrates an example computer system (a machine) within which a set of instructions, for causing the machine to perform any one or more of the methodologies, as disclosed herein.

FIG. 10 illustrates an example machine of a computer system 1000 (a machine) within which a set of instructions, for causing the machine to perform any one or more of the methodologies discussed herein, can be executed. In some examples, the computer system 1000 corresponds to a host system (e.g., the host system 120 of FIG. 1) that includes, is coupled to, or utilizes a memory sub-system (e.g., the memory sub-system 110 of FIG. 1) or is used to perform the operations of a controller. In other examples, the machine is connected (e.g., networked) to other machines in a LAN, an intranet, an extranet and/or the Internet. In various examples, the machine operates in the capacity of a server or a client machine in a client server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automobile, a data center, a smart factory or other industrial application. Further, while a single machine is illustrated, the term "machine" shall also be taken to include any collection of machines that individually or jointly execute a set (or multiple sets) of instructions to perform the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM) or other non-transitory computer-readable media) and a data storage system 1018, which communicate with each other via a bus 1030.

The processing device 1002 represents one or more general-purpose processing devices such as a microprocessor, a central processing unit, etc. More particularly, the processing device 1002 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 1002 is implemented with a special-purpose processing devices such as an application specific integrated circuit (ASIC), a field programmable gate array (FPGA), a digital signal processor (DSP), network processor, etc. The processing device 1002 is configured to execute instructions 1026 for performing the operations discussed herein. In some examples, the computer system 1000 includes a network interface device 1008 to communicate over the network 1020.

The data storage system 1018 includes a machine-readable storage medium 1024 (also known as a computer-readable medium) that stores sets of instructions 1026 or software for executing the methodologies and/or functions described herein. The machine-readable storage medium 1024 is a non-transitory medium. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018 and/or main memory 1004 can correspond to the memory sub-system 110 of FIG. 1. Accordingly, the machine-readable storage medium 1024, the data storage system 1018 and/or the main memory 1004 are examples of non-transitory computer-readable media.

In some examples, the instructions 1026 include instructions to a data write and/or a data integrity scan. While the machine-readable storage medium 1024 is shown in an example to be a single medium, the term "machine-readable storage medium" should be taken to include a single medium or multiple media that stores the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes, or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general-purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for detecting an abnormal program sequence on a memory device, the method comprising:
    initiating, by a memory controller, a timing process by either starting a timer or recording an initial timer value from the timer;
    checking, by the memory controller, in response to initiating the timing process, a status register of the memory device to determine whether the memory device is in a busy state corresponding to implementing a program operation;
    stopping, by the memory controller, the timer or recording a current timer value in response to determining that the memory device is not in the busy state;
    determining, by the memory controller, in response to the stopping, an elapsed time of the timer, or based on the initial and current timer values to provide a checked operation time; and
    evaluating, by the memory controller, the checked operation time and a defined operation time for the program operation to determine whether a program sequence for implementing the program operation was abnormal, wherein the evaluating comprises:
        determining that the program sequence was abnormal in response to determining that the checked operation time is less than the defined operation time.

2. The method of claim 1, further comprising:
    detecting, by the memory controller, that the memory controller issued a program command to initiate the program operation on the memory device; and
    determining, by the memory controller, a type of program command that was issued by the memory controller.

3. The method of claim 2, further comprising identifying the defined operation time from a set of defined operation times based on the determined type of program command.

4. The method of claim 2, further comprising identifying, by the memory controller, the timer from a set of timers based on the determined type of program command.

5. The method of claim 1, wherein the evaluating comprises determining that the program sequence was abnormal in response to determining that the checked operation time exceeded the defined operation time by a predetermined amount of time.

6. The method of claim 5, further comprising outputting an error type indicating that the checked operation time is less than the defined operation time.

7. The method of claim 6, wherein the error type is a first error type, the method further comprising outputting a second error type indicating that the checked operation time exceeded the defined operation time by the predetermined amount of time.

8. A method for detecting an abnormal program sequence on a memory device, the method comprising:
    initiating, by a memory controller, a timing process by either starting a timer or recording an initial timer value from the timer;
    checking, by the memory controller, in response to initiating the timing process, a status register of the memory device to determine whether the memory device is in a busy state corresponding to implementing a program operation;
    stopping, by the memory controller, the timer or recording a current timer value in response to determining that the memory device is not in the busy state;
    determining, by the memory controller, in response to the stopping, an elapsed time of the timer, or based on the initial and current timer values to provide a checked operation time;
    evaluating, by the memory controller, the checked operation time and a defined operation time for the program operation to determine whether a program sequence for implementing the program operation was abnormal; and
    setting, by the memory controller, one or more error status bits to trigger a data recovery protocol to recover from a defective or corrupted program operation in response to determining the program sequence is abnormal.

9. A method for detecting an abnormal program sequence on a memory device, the method comprising:
    initiating, by a memory controller, a timing process by either starting a timer or recording an initial timer value from the timer;
    checking, by the memory controller, in response to initiating the timing process, a status register of the memory device to determine whether the memory device is in a busy state corresponding to implementing a program operation;
    stopping, by the memory controller, the timer or recording a current timer value in response to determining that the memory device is not in the busy state;
    determining, by the memory controller, in response to the stopping, an elapsed time of the timer, or based on the initial and current timer values to provide a checked operation time;
    evaluating, by the memory controller, the checked operation time and a defined operation time for the program operation to determine whether a program sequence for implementing the program operation was abnormal;
    recording, by the controller, the initial timer value from the timer in response to a program command being issued to initiate the program operation on the memory device;

recording, by the controller, the current timer value from the timer in response to determining that the memory device is not in the busy state; and subtracting, by the controller, the initial timer value from the current timer value to provide the checked operation time.

10. The method of claim 9, further comprising one of:

determining, by the controller, that the program sequence was abnormal in response to determining that the checked operation time exceeded the defined operation time by a predetermined amount of time to provide an indication of a first error type;

determining, by the controller, that the program sequence was abnormal in response to determining that the checked operation time is less than the defined operation time to provide an indication of a second error type; and determining, by the controller, that the program operation failed to provide an indication of a third error type.

11. A system for detecting an abnormal program sequence in a non-volatile memory system, the system comprising:

a memory device comprising a status register comprising one or more operation state bits indicative of whether the memory device is a busy or a not busy state; and a controller with a detector to:

detect whether a program sequence for implementing a program operation on the memory device is abnormal based on the one or more operation state bits of the status register and based on evaluation of a defined operation time for the program operation and an amount of time that has elapsed on a timer since being started in response to the controller providing a program command to initiate the program operation on the memory device; and identify the timer from a set of timers based on a type of program command provided by the memory controller, the timer being started by the detector in response to identifying the timer.

12. The system of claim 11, wherein the memory device is a Not-AND (NAND) memory device.

13. The system of claim 11, wherein the detector is to stop the timer in response to determining that the memory device is not in the busy state based on the one or more operation state bits.

14. The system of claim 11, wherein the detector is to evaluate the amount of time that has elapsed on the timer since being started in response to the controller providing the program command and the defined operation time to determine whether the program sequence for performing the program operation was abnormal.

15. A system for detecting an abnormal program sequence in a non-volatile memory system, the system comprising:

a memory device comprising a status register comprising one or more operation state bits indicative of whether the memory device is a busy or a not busy state; and a controller with a detector to detect whether a program sequence for implementing a program operation on the memory device is abnormal based on the one or more operation state bits of the status register and based on evaluation of a defined operation time for the program operation and an amount of time that has elapsed on a timer since being started in response to the controller providing a program command to initiate the program operation on the memory device;

wherein the controller comprises an error handler to claw back data from system memory and reprogram the data in the memory device in response to determining that the program sequence was abnormal.

16. A non-transitory computer-readable medium storing instructions that, when executed by a processor, perform operations for detecting an abnormal program sequence in a non-volatile memory system, the operations comprising:

issuing a program command to initiate a program operation on memory device;

recording an initial timer value from a timer in response to the issuing;

determining whether the memory device is in a busy state corresponding to performing the program operation in response to the recording of the initial timer value;

recording a current timer value from the timer in response to determining that the memory device is not in the busy state;

determining a checked operation time based on the initial and current timer values;

evaluating the checked operation time and defined operation time to determine whether the program sequence for performing the program operation was abnormal; and determining that the program sequence was abnormal in response to determining that the checked operation time is less than the defined operation time.

17. A non-transitory computer-readable medium storing instructions that, when executed by a processor, perform operations for detecting an abnormal program sequence in a non-volatile memory system, the operations comprising:

issuing a program command to initiate a program operation on memory device;

recording an initial timer value from a timer in response to the issuing;

determining whether the memory device is in a busy state corresponding to performing the program operation in response to the recording of the initial timer value;

recording a current timer value from the timer in response to determining that the memory device is not in the busy state;

determining a checked operation time based on the initial and current timer values;

evaluating the checked operation time and defined operation time to determine whether the program sequence for performing the program operation was abnormal; and determining that the program sequence was abnormal in response to determining that the checked operation time exceeded the defined operation time by a predetermined amount of time.

* * * * *